(12) United States Patent
Wang et al.

(10) Patent No.: US 10,438,048 B2
(45) Date of Patent: Oct. 8, 2019

(54) LEARNING MODEL FOR SALIENT FACIAL REGION DETECTION

(71) Applicant: Samsung Electronics Co., Ltd., Suwon-si, Gyeonggi-do (KR)

(72) Inventors: Xiaolong Wang, Sunnyvale, CA (US); Yin Zhou, San Jose, CA (US); Bo Li, San Jose, CA (US); Jonathan J. Currey, Belmont, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 128 days.

(21) Appl. No.: 15/449,266

(22) Filed: Mar. 3, 2017

(65) Prior Publication Data

US 2017/0351905 A1   Dec. 7, 2017

Related U.S. Application Data

(60) Provisional application No. 62/346,208, filed on Jun. 6, 2016.

(51) Int. Cl.
*G06K 9/00* (2006.01)
*G06K 9/62* (2006.01)

(52) U.S. Cl.
CPC ..... *G06K 9/00241* (2013.01); *G06K 9/00268* (2013.01); *G06K 9/00281* (2013.01);
(Continued)

(58) Field of Classification Search
CPC ..... G06K 9/00288; G06K 2009/00322; G06K 9/00268; G06K 9/00281
See application file for complete search history.

(56) References Cited

U.S. PATENT DOCUMENTS

| 6,301,370 B1 | 10/2001 | Steffens et al. |
| 7,043,056 B2 | 5/2006 | Edwards et al. |

(Continued)

FOREIGN PATENT DOCUMENTS

| WO | 2011061709 A1 | 5/2011 |
| WO | 2012146253 A1 | 11/2012 |
| WO | 2015154206 A1 | 10/2015 |

OTHER PUBLICATIONS

Zeng, J. et al., "Analysis of Facial Images across Age Progression by Humans", International Scholarly Research Network, 2012, pp. 1-8, vol. 2012, United States.

(Continued)

*Primary Examiner* — Li Liu
(74) *Attorney, Agent, or Firm* — Sherman IP LLP; Kenneth L. Sherman; Hemavathy Perumal

(57) ABSTRACT

One embodiment provides a method comprising receiving a first input image and a second input image. Each input image comprises a facial image of an individual. For each input image, a first set of facial regions of the facial image is distinguished from a second set of facial regions of the facial image based on a learning based model. The first set of facial regions comprises age-invariant facial features, and the second set of facial regions comprises age-sensitive facial features. The method further comprises determining whether the first input image and the second input images comprise facial images of the same individual by performing face verification based on the first set of facial regions of each input image.

20 Claims, 9 Drawing Sheets

(52) U.S. Cl.
CPC ..... *G06K 9/00288* (2013.01); *G06K 9/00308* (2013.01); *G06K 9/6255* (2013.01); *G06K 2009/00322* (2013.01)

(56) References Cited

U.S. PATENT DOCUMENTS

| | | | |
|---|---|---|---|
| 7,505,621 B1* | 3/2009 | Agrawal | G06K 9/00288 382/118 |
| 7,657,083 B2 | 2/2010 | Parr et al. | |
| 8,111,904 B2 | 2/2012 | Wallack et al. | |
| 8,116,538 B2 | 2/2012 | Kim et al. | |
| 8,280,136 B2 | 10/2012 | Gotardo et al. | |
| 8,351,662 B2 | 1/2013 | Wang | |
| 8,385,663 B2 | 2/2013 | Xu et al. | |
| 8,401,225 B2 | 3/2013 | Newcombe et al. | |
| 8,532,344 B2 | 9/2013 | Connell et al. | |
| 8,732,025 B2 | 5/2014 | Gokturk et al. | |
| 8,837,779 B2 | 9/2014 | Meier et al. | |
| 9,031,317 B2 | 5/2015 | Yakubovich et al. | |
| 9,058,513 B2 | 6/2015 | Irie | |
| 9,081,947 B2 | 7/2015 | Dewan et al. | |
| 9,152,850 B2 | 10/2015 | Mogi | |
| 9,208,337 B2 | 12/2015 | Tayloe | |
| 9,325,707 B2 | 4/2016 | Ketchantang | |
| 9,329,771 B2 | 5/2016 | Fadell et al. | |
| 9,330,426 B2 | 5/2016 | Davis | |
| 9,330,511 B2 | 5/2016 | Webber et al. | |
| 9,686,527 B2 | 6/2017 | Chen et al. | |
| 9,710,729 B2 | 7/2017 | Chidlovskii et al. | |
| 2008/0260212 A1 | 10/2008 | Moskal et al. | |
| 2010/0027895 A1 | 2/2010 | Noguchi et al. | |
| 2011/0222724 A1* | 9/2011 | Yang | G06K 9/00248 382/103 |
| 2011/0243451 A1 | 10/2011 | Oyaizu et al. | |
| 2011/0286628 A1 | 11/2011 | Goncalves et al. | |
| 2013/0100119 A1 | 4/2013 | Evertt et al. | |
| 2013/0342702 A1 | 12/2013 | Zhang et al. | |
| 2014/0072185 A1 | 3/2014 | Dunlap et al. | |
| 2014/0098242 A1 | 4/2014 | Sharma et al. | |
| 2014/0254893 A1 | 9/2014 | Phillips et al. | |
| 2014/0304122 A1 | 10/2014 | Rhoads et al. | |
| 2014/0376775 A1 | 12/2014 | Datta et al. | |
| 2014/0378810 A1 | 12/2014 | Davis et al. | |
| 2015/0110381 A1 | 4/2015 | Parvin et al. | |
| 2015/0138310 A1 | 5/2015 | Fan et al. | |
| 2015/0178554 A1 | 6/2015 | Kanaujia et al. | |
| 2015/0324655 A1 | 11/2015 | Chalasani et al. | |
| 2016/0171346 A1 | 6/2016 | Han et al. | |
| 2016/0232678 A1 | 8/2016 | Kurz et al. | |
| 2016/0358043 A1* | 12/2016 | Mu | G06F 16/51 |
| 2017/0076474 A1* | 3/2017 | Fu | G06T 11/00 |
| 2017/0154209 A1* | 6/2017 | Nakano | G06K 9/00255 |
| 2017/0256068 A1 | 9/2017 | Wang et al. | |
| 2017/0304732 A1 | 10/2017 | Velic et al. | |
| 2017/0351909 A1* | 12/2017 | Kaehler | G06K 9/00288 |

OTHER PUBLICATIONS

Ramanathan, N. et al., "Face Verification across Age Progression", Journal of Visual Language and Computing, Jun. 30, 2009, pp. 131-144, United States.

Singh, R. et al., "Age Transformation for Improving Face Recognition Performance", In Pattern Recognition and Machines Intelligence (PReMI 2007), 2007, pp. 576-583, Springer, Berlin, Heidelberg.

Ling, H. et al., "Face Verification across Age Progression using Discriminative Methods", Proceedings of the IEEE Transactions on Information Forensics and Security, 2010, pp. 1-9, IEEE, United States.

Mahalingam, G. et al., "Age invariant Face Recognition Using Graph Matching", Proceedings of the 2010 Fourth IEEE International Conference on Biometrics: Theory Applications and Systems (BTAS), Sep. 27-29, 2010, pp. 1-7, IEEE, United States.

Ling, H. et al., "A Study of Face Recognition as People Age", Proceedings of the IEEE 11th International Conference on Computer Vision (ICCV 2007), Oct. 14-21, 2007, pp. 1-8, IEEE, United States.

Ramanathan, N. et al., "Computational methods for modeling facial aging: A survey", Journal of Visual Languages and Computing, Jun. 2009, pp. 131-144, vol. 20, Issue 3.

Chen, B-C. et al., "Cross-Age Reference Coding for Age-Invariant Face Recognition and Retrieval", Proceedings of the European Conference of Computer Vision (ECCV 2014), 2014, pp. 768-783, Springer.

Bianco, S. "Large age-gap face verification by feature injection in deep networks", Feb. 19, 2016, pp. 1-7, Cornell University Library, United States.

Du, L. et al., "Cross-Age Face Verification by Coordinating with Cross-Face Age Verification", Proceedings of 2015 IEEE Conference on Computer Vision and Pattern Recognition (CVPR), Jun. 7-12, 2015, pp. 2329-2338, IEEE, United States.

International Search Report and Written Opinion dated Jun. 1, 2017 for International Application PCT/KR2017/002177 from Korean Intellectual Property Office, pp. 1-12, Republic of Korea.

Anonymous, "iPhone 7 may feature Facial Recognition instead of Touch-ID" Blog, Iphone 7 Buzz, Mar. 22, 2015, pp. 1-4, United States [downloaded from http://www.iphone7buzz.com/iphone-7-may-feature-facial-recognition-instead-of-touch-id/ on Jun. 12, 2017].

U.S. Non-Final Office Action for U.S. Appl. No. 15/418,614 dated Jun. 18, 2018.

U.S. Advisory Action for U.S. Appl. No. 15/418,614 dated Mar. 29, 2019.

U.S. Final Office Action for U.S. Appl. No. 15/418,614 dated Jan. 23, 2019.

Extended European Search Report dated Feb. 20, 2019 for European Application No. 17760282.8 from European Patent Office, pp. 1-6, Munich, Germany.

U.S. Notice of Allowance for U.S. Appl. No. 15/418,614 dated May 7, 2019.

U.S. Corrected Notice of Allowability for U.S. Appl. No. 15/418,614 dated May 31, 2019.

* cited by examiner

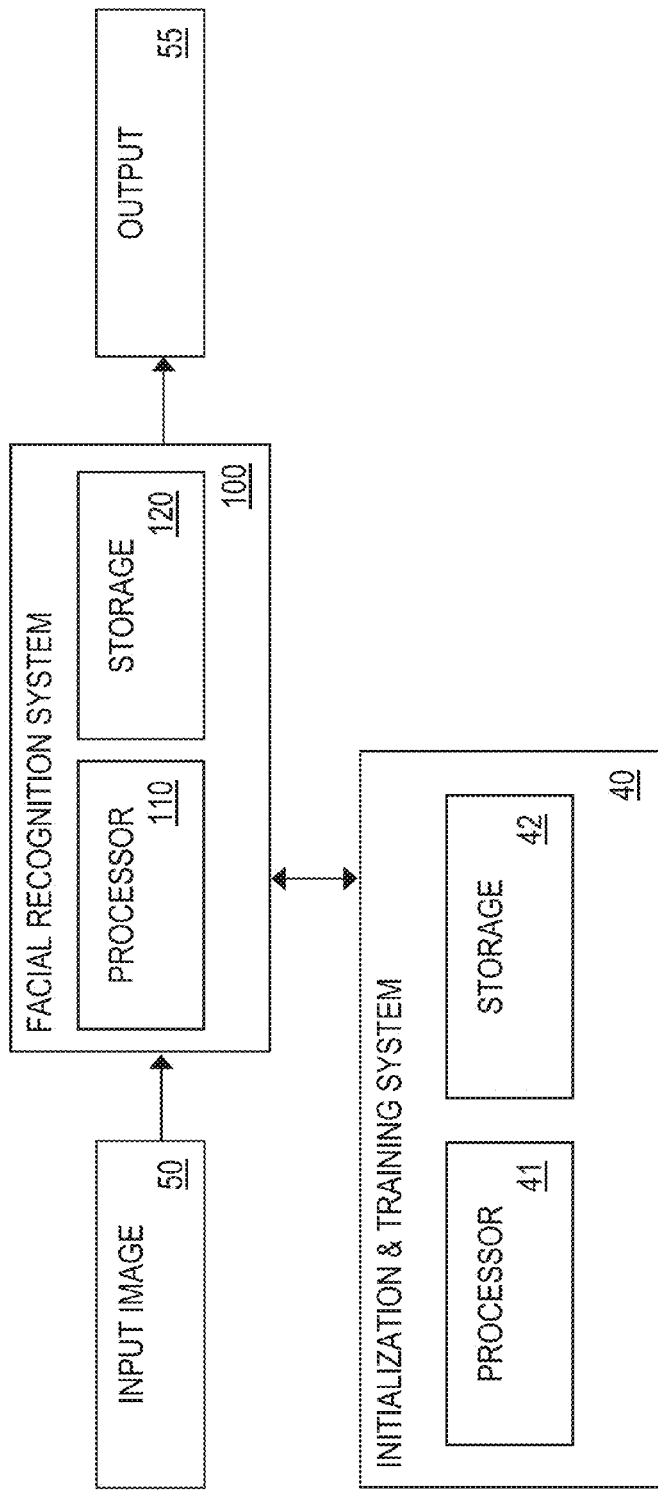

LEARNING MODEL FOR SALIENT FACIAL REGION DETECTION

CROSS REFERENCE TO RELATED APPLICATIONS

This application claims priority from U.S. Provisional Patent Application Ser. No. 62/346,208, filed on Jun. 6, 2016, incorporated herein by reference.

TECHNICAL FIELD

One or more embodiments relate generally to facial analysis, and in particular, a learning model for salient facial region detection.

BACKGROUND

Facial images of individuals convey large quantities of demographic facial information, such as emotion, expression, identity, age, gender, ethnicity, etc. As such, facial image analysis is important in a wide variety of applications in multiple areas, such as security, law-enforcement, entertainment, a human-computer interaction (HCI) system, and artificial intelligence (AI) systems.

There are different types of facial image analysis tasks, such as face verification and age estimation. Some facial regions may be more important to some facial image analysis tasks compared to other facial regions. For example, for age estimation, facial regions with age variation are analyzed. By comparison, for face verification, age-invariant facial regions (e.g., eyes, nose, mouth, etc.) are analyzed. Facial regions with age variations (e.g., forehead with wrinkles, etc.), however, are not helpful for face verification as conflicting facial patterns may arise between age and identity. Facial images that show age variations in certain facial regions typically lead to increased differences in facial appearance, thereby increasing the difficulty at which face verification with age changes (i.e., face matching between facial images showing large age gaps) is performed. One conventional solution for improving cross-age face recognition is face synthesis (i.e., face modeling). In face synthesis, an input facial image is synthesized to a target age. It is very difficult, however, to accurately synthesize and simulate an unpredictable aging progress if aging patterns are unknown. Another conventional solution for improving cross-age face recognition is automatically identifying age-invariant facial regions.

Conventionally, as the importance of certain facial regions varies for different facial image analysis tasks, different facial image analysis tasks are preformed utilizing different distinctive frameworks. There does not exist an existing framework that can handle multiple conflicting facial image analysis tasks.

SUMMARY

One embodiment provides a method comprising receiving a first input image and a second input image. Each input image comprises a facial image of an individual. For each input image, a first set of facial regions of the facial image is distinguished from a second set of facial regions of the facial image based on a learning based model. The first set of facial regions comprises age-invariant facial features, and the second set of facial regions comprises age-sensitive facial features. The method further comprises determining whether the first input image and the second input images comprise facial images of the same individual by performing face verification based on the first set of facial regions of each input image.

These and other features, aspects and advantages of the one or more embodiments will become understood with reference to the following description, appended claims and accompanying figures.

BRIEF DESCRIPTION OF THE DRAWINGS

FIG. 1 illustrates an example computing architecture for implementing a facial analysis system, in one or more embodiments;

DETAILED DESCRIPTION

Figure 2A:
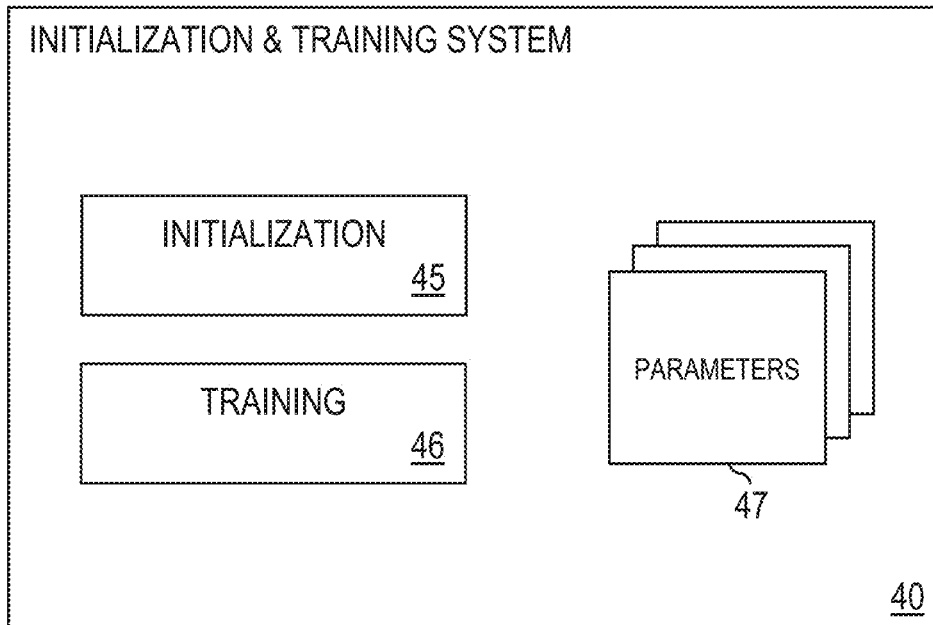
FIG. 2A illustrates the initialization and training system in detail, in one or more embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

In this specification, the term "age label" is used to generally refer to information indicative of an age of an individual based on one or more features extracted from one or more age-sensitive facial regions of a facial image of the individual. An age label may be classified as either an actual/known age label based on observed data or an estimated/predicted age label based on belief data.

In this specification, the term "face verification" is used to generally refer to a facial image analysis task where two facial images of individuals are compared to determine if the facial images capture the same individual.

In this specification, the term "age estimation" is used to generally refer to a facial image analysis task where an estimated/predicted age of an individual captured in a facial image is determined.

In this specification, the term "cross-face age verification" is used to generally refer to a facial image analysis task where two facial images of individuals at different ages are compared to determine if the facial images capture the same individual.

One or more embodiments relate generally to facial analysis, and in particular, a learning model for salient facial region detection. One embodiment provides a method comprising receiving a first input image and a second input image. Each input image comprises a facial image of an individual. For each input image, a first set of facial regions of the facial image is distinguished from a second set of facial regions of the facial image based on a learning based model. The first set of facial regions comprises age-invariant facial features, and the second set of facial regions comprises age-sensitive facial features. The method further comprises determining whether the first input image and the second input images comprise facial images of the same individual by performing face verification based on the first set of facial regions of each input image.

As the importance of certain facial regions varies for different facial image analysis tasks, one embodiment provides a single framework that may be used for conflicting facial image analysis tasks. The framework boosts performance for different facial image analysis tasks (e.g., face verification, age estimation, face synthesis, etc.). The framework provides an end-to-end network for extracting specific demographic facial information from one or more facial regions related to a given facial image analysis task and excluding one or more other facial regions not related to the task. The end-to-end network is an automatic pipeline configured to perform different facial image analysis tasks. For example, to synthesize a facial image of a male, the end-to-end network focuses on extracting facial information from gender sensitive facial regions for the male instead of an entire face.

In one example implementation, the end-to-end network utilizes a jointed deep neural network that learns facial features. The jointed deep neural network is trained to simultaneously learn a set of related learning tasks. After training, the jointed deep neural network may be used to solve conflicting facial image analysis tasks as a feature learned from a certain learning task may also be relevant to another learning task. For example, face verification may be set as a primary task and age estimation may be set as an auxiliary task. In one embodiment, the end-to-end network comprises a Siamese deep neural network including two coupled deep convolutional neural networks (CNNs) that share the same parameters (e.g., weights). Contrastive loss may be used for face verification and a soft-max function may be used for age estimation.

One embodiment provides a learning based model for automatic salient facial region detection. The learning based model may be used for conflicting facial image analysis tasks. The learning based model may be used to locate a salient facial region relevant to a specific facial image analysis task, thereby increasing accuracy for demographic facial information perception. For example for face verification, the learning based model may be used to extract facial information from age-invariant facial regions. By comparison, for age estimation, the same learning based model may be used to extract facial information from age-sensitive facial regions (i.e., facial regions with age changes).

One embodiment provides a multi-task framework for both age estimation and identity estimation. The framework may be applied on different face-aging benchmark datasets, such as MORPH and FG-NET. Face verification that accounts for age changes (i.e., face matching between facial images showing large age gaps) may have a wide range of applications such as, but not limited to, finding missing persons (e.g., identify trafficked children after a long period of time) and other forensic areas.

FIG. 1 illustrates an example computing architecture 10 for implementing a facial analysis system 100, in one or more embodiments. The computing architecture 10 comprises an initialization and training system 40 comprising computation hardware such as, but not limited to, one or more processor devices 41 and one or more storage devices 42. The computing architecture 10 further comprises a facial analysis system 100 including computation hardware such as, but not limited to, one or more processor devices 110 and one or more storage devices 120. As described in detail later herein, one or more applications may execute/operate on the one or more processor devices 41 to create, initialize, and iteratively train a learning based model 130 (FIG. 2B) maintained by the facial analysis system 100. The learning based model 130 provides a single framework that may be used for conflicting facial image analysis tasks.

The facial analysis system 100 is configured to receive an input image 50 (e.g., a facial image of an individual, an image of an object, etc.) and provide an output 55 comprising information relating to the input image 50 (e.g., an estimated/predicted age of an individual captured in the input image 50, etc.).

In one embodiment, the computing architecture 10 is a centralized computing architecture. In another embodiment, the computing architecture 10 is a distributed computing architecture.

In one embodiment, the facial analysis system 100 is implemented on a mobile electronic device (e.g., a tablet, a smart phone, a laptop, etc.). The mobile electronic device may comprise one or more sensors (e.g., a camera, etc.) for capturing an input image 50.

FIG. 2A illustrates the initialization and training system 40 in detail, in one or more embodiments. As stated above, one or more applications may execute/operate on the one or more processor devices 41 (FIG. 1) of the initialization and training system 40. In one embodiment, the applications include, but are not limited to, the following: (1) an initialization unit 45 configured to create and initialize the learning based model 130 (FIG. 2B) of the facial analysis system 100 utilizing the computation hardware of the facial analysis system 100 (e.g., the one or more processor devices 110 and/or the one or more storage devices 120 shown in FIG. 1), and (2) a training unit 46 configured to iteratively train the learning based model 130.

In one embodiment, the storage devices 42 of the initialization and training system 40 maintain one or more databases. The databases include, but are not limited to, a set of databases 47 maintaining parameters for use in creating, initializing, and training the learning based model 130.

Figure 2B:
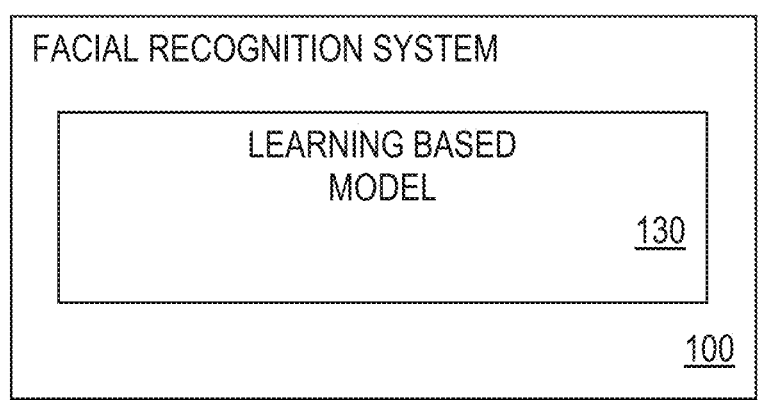
FIG. 2B illustrates the facial analysis system in detail, in one or more embodiments.

FIG. 2B illustrates the facial analysis system 100 in detail, in one or more embodiments. As stated above, the facial analysis system 100 comprises a learning based model 130 providing a single framework that may be used for conflicting facial image analysis tasks.

Figure 3:
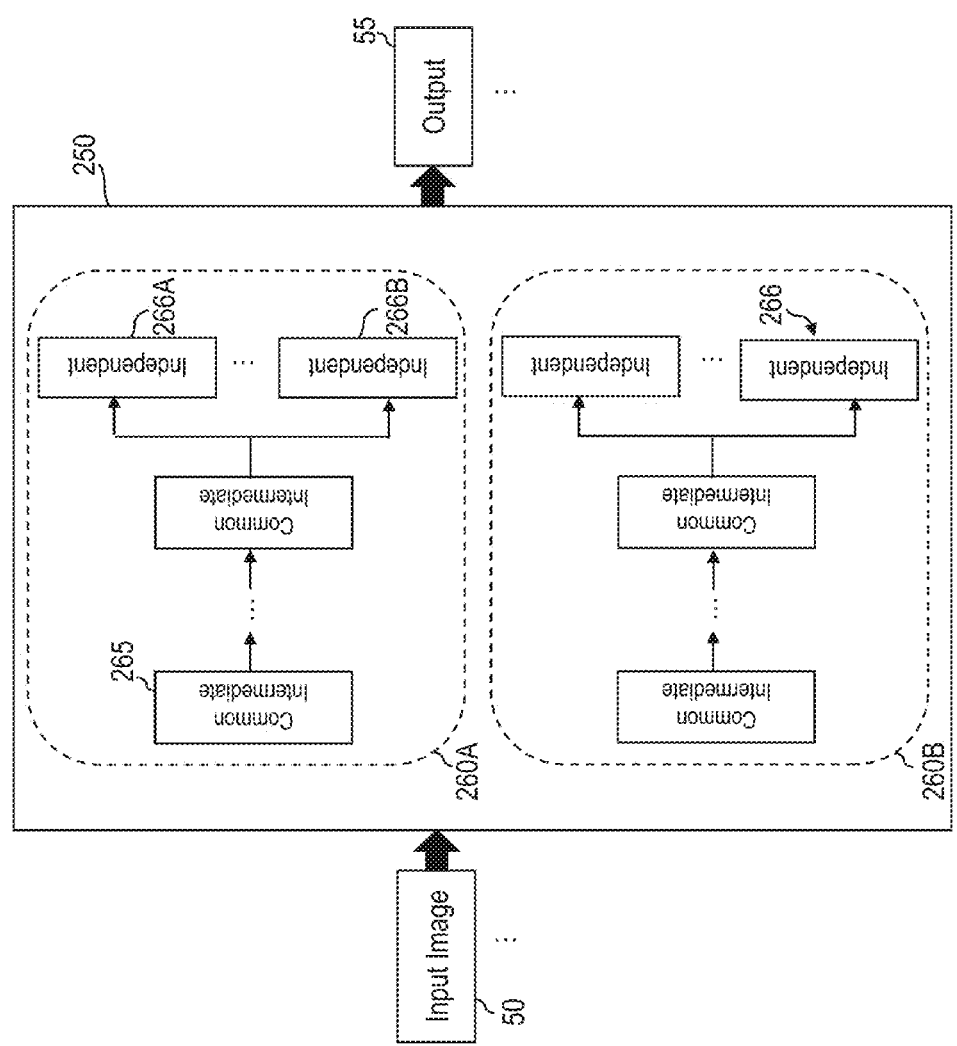
FIG. 3 illustrates an example deep neural network of the facial analysis system, in one or more embodiments.

In one embodiment, the learning based model 130 comprises an end-to-end deep neural network 250 (FIG. 3). As described in detail later herein, the deep neural network 250 comprises one or more convolutional neural networks (CNNs), wherein each CNN comprises a plurality of weighted layers, and each layer comprises a plurality of neurons interconnected via a plurality of synaptic connections. Each layer accepts an input and transforms the input to an output that is forwarded to a subsequent layer, if any. The set of databases 47 (FIG. 2A) maintains network parameters (e.g., weights, etc.) for use in creating, initializing, and training each layer of the deep neural network 250.

Figure 7:
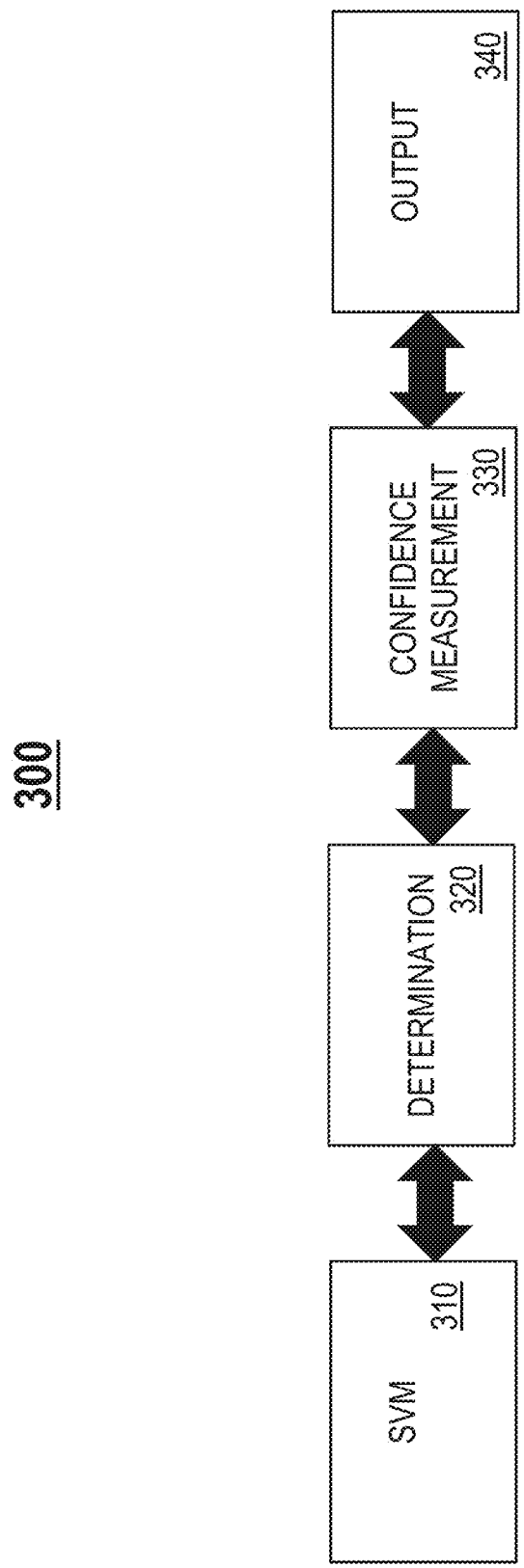
FIG. 7 illustrates another example framework for the facial analysis system, in one or more embodiments.

In another embodiment, the learning based model 130 comprises one or more support vector machines (SVMs) (FIG. 7).

Table 1 provided below comprises a listing identifying different parameters referenced in this specification.

TABLE 1

| Parameters | Definition |
| --- | --- |
| T | Set of supervised learning tasks |
| t | Task of the set T |
| $n_t$ | Number of samples available for a task t (i.e., size of input space) |
| $p_t$ | Dimension of samples available for a task t (i.e., dimension of an input space) |
| $X_t$ | Model for a task t, wherein $X_t \in R^{n_t \times p_t}$ |
| $y_t$ | Training data for a task t, wherein $y_t \in R^{n_t}$ |
| D | Set of training data for the set T, wherein $D = \{D_1, \ldots, D_T\}$ |
| $D_t$ | Training data for a task t, wherein $D_t = \{X_t, y_t\}$ |
| $\theta_i$ | Network parameter for a task t, wherein $\theta_t \in R^{d_t}$ |
| $L_i(\theta_i; X_t, y_t)$ | Loss function for estimating loss for a task t |
| $d_t$ | Parameter space for task t, wherein $d_t \gg p_t$ (i.e., parameter space is larger than input space) |
| $\mathcal{R}(\{\theta_i\}_{i=1}^T)$ | Coupling term that couples tasks of the set T |
| $L_F$ | Loss function for estimating loss for face verification |
| $L_A$ | Loss function for estimating loss for age estimation |
| $\theta_F^I$ | Independent network parameters for face verification |
| $\theta_F^S$ | Shared network parameters for face verification |
| $\theta_F$ | Network parameters for face verification, wherein $\theta_F = \{\theta_F^S, \theta_F^I\}$ |
| $\theta_A^I$ | Independent network parameters for age estimation |
| $\theta_A^S$ | Shared network parameters for age estimation |
| $\theta_A$ | Network parameters for age estimation, wherein $\theta_A = \{\theta_A^S, \theta_A^I\}$ |
| $X_F$ | Model for face verification |
| $X_A$ | Model for age estimation |
| $y_F$ | Training data for face verification |
| $y_A$ | Training data for age estimation |
| $n_A$ | Number of samples available for age estimation |
| $\mathcal{R}(\{\theta_F, \theta_V\})$ | Coupling term that couples face verification and age estimation |

FIG. 3 illustrates an example deep neural network 250 of the facial analysis system 100, in one or more embodiments. In one embodiment, the deep neural network 250 is a Siamese deep neural network comprising two coupled deep CNNs. Specifically, the deep neural network 250 comprises a first CNN 260A and a second 260B.

In a training phase, the deep neural network 250 is trained to simultaneously learn a set of tasks T (e.g., regression, classification, etc.). In order to leverage relatedness between tasks of the set T to improve generalization performance of all the tasks, the deep neural network 250 implements a joint learning process to enforce learning of one task of the set T to bias and be biased by learning of one or more other tasks of the set T, thereby allowing useful predictive knowledge to be transferred among the tasks. After the training phase, the deep neural network 250 may be used to solve conflicting tasks (e.g., conflicting facial image analysis tasks) as a feature learned from one task during the training phase may also be relevant to another task. For example, if the set T includes face verification and age estimation, demographic facial information indicative of age learned for age estimation may be useful for perception of faces and may be relevant to face verification.

In one embodiment, loss functions for all tasks of the set T are joint optimized in accordance with equation (1) provided below:

$$\min_{\{\theta_i\}_{i=1}^T} \sum_{i=1}^T L_i(\theta_i, X_t, y_t) + \mathcal{R}(\{\theta_i\}_{i=1}^T), \tag{1}$$

wherein the coupling term $\mathcal{R}(\{\theta_i\}_{i=1}^T)$ enforces inductive knowledge transfer. Different coupling terms may convey different assumptions about how the tasks are related to one other. If the coupling term $\mathcal{R}(\{\theta_i\}_{i=1}^T)$ is decoupled for each task of the set T, learning of the tasks are also decoupled, resulting in no effective knowledge transfer.

Equation (1) provided above represents a multi-task learning objective implemented by the deep neural network 250.

In the training phase, learning is focused on a subset of the set T designated as primary tasks; a remaining subset of the set T are designated as auxiliary tasks. The determination as to which task of a set T to designate as a primary task may be based on several factors such as, but not limited to, availability of data for the task, availability of descriptors for the task, etc. For example, if the set T includes face verification, face verification may be designated as a primary task as there is a significant amount of facial images available for face verification. By comparison, if the set T includes cross-age face recognition, cross-age face recognition is less likely to be designated as a primary task as data available for cross-age face recognition is limited and obtaining actual/known age labels is challenging.

Each CNN 260A, 260B corresponds to at least one task of the set T. For example, each CNN 260A, 260B may be trained to learn a primary task (e.g., face verification) and an auxiliary task (e.g., age estimation).

In a deployment phase, the deep neural network 250 is configured to: (1) receive one or more input images 50 and corresponding metadata, (2) perform one or more tasks of the set T on the one or more input images 50 received, and (3) provide one or more outputs 55 relating to the one or more input images 50 received based on the one or more tasks performed. If the set T comprises facial image analysis tasks, the one or more input images 50 may comprise different facial images of the same individual (e.g., facial images capturing the same individual at different ages to show an age gap) or different individuals. Corresponding metadata for the facial images may comprise, for each facial image, corresponding ground truth information comprising an actual age label indicative of an actual age of the individual in the facial image.

The number of tasks performed and the number of outputs 55 provided are each based on the number of input images 50 received. For example, if only one input image 50 is fed to the deep neural network 250 for processing in the deployment phase, the deep neural network 250 performs at least one task on the input image 50 and provides at least one output 55 relating to the input image 50 based on the at least one task performed. In one example implementation, the deep neural network 250 performs age estimation on the input image 50 and provides a single output 55 comprising an estimated/predicted age of an individual captured in the input image 50. In another example implementation, the deep neural network 250 performs both face verification and age estimation on the input image 50 and provides two different outputs—a first output 55 indicating whether the input image 50 and a pre-stored/default image capture the same individual, and a second output 55 comprising an estimated/predicted age of an individual captured in the input image 50.

As another example, if multiple input images 50 are fed to the deep neural network 250 for processing in the deployment phase, the deep neural network 250 performs multiple tasks on the input images 50, and provides multiple different outputs 55 relating the input images 50. In one example implementation, if the input images 50 comprise a first input image 50 and a second input image 50, the deep neural network 250 performs both face verification and age estimation on the first and second input images 50, and provides three different outputs 55—a first output 55 indicating whether the first and second input images 50 capture the same individual, a second output 55 comprising an estimated/predicted age of an individual captured in the first input image 50, and a third output 55 comprising an estimated/predicted age of an individual captured in the second input image 50.

Even if data available for a task is limited, the deep neural network 250 is configured to generate enough training data as the deep neural network 250 is a Siamese deep neural network. For example, for an individual/object captured in an input image, the deep neural network 250 may generate a corresponding set of positive sample pairs and a corresponding set of negative sample pairs. For face verification, a positive sample pair may comprise a pair of facial images of the same individual/object, and a negative sample pair may comprise a pair of facial images of different individuals/objects.

For example, if the set T include facial image analysis tasks and there are n different facial images available of an individual, the deep neural network 250 may generate $Cn^2$ positive sample pairs, wherein C is a positive integer.

In one embodiment, a contrastive (i.e., discriminative) loss function may be minimized to reduce the difference between images of the same individual/object and increase a difference between images of different individuals/objects. In one embodiment, for a pair of input images (i, j), a contrastive loss function $L_F$ for estimating loss for face verification may defined in accordance with equation (2) provided below:

$$L_F(\theta_F; X_F, y_F) \triangleq \sum_{ij} Z_{ij}D_{ij} + (1-Z_{ij})\max(m - D_{ij}, 0), \quad (2)$$

wherein m is a positive number, wherein Dij denotes a feature distance defined in accordance with equation (2.1) provided below:

$$D_{ij} = \|\tilde{X}_i(\theta_F) - \tilde{X}_j(\theta_F)\|^2 \quad (2.1),$$

wherein $\tilde{X}_i(\theta_F)$ is defined in accordance with equation (2.2) provided below:

$$\tilde{X}_i(\theta_F) = \mathscr{F}_{\theta_F}(X_i) \quad (2.2), \text{ and}$$

wherein $Z_{ij}=1$ for different individuals/objects (i.e., i and j are a negative sample pair), and wherein $Z_{ij}=0$ for the same individual/object (i.e., i and j are a positive sample pair). The positive number m acts as a margin to ensure that an engergy function for a negative sample pair is larger than that of a positive sample pair by at least m. The contrastive loss function $L_F$ comprises two penalties: (1) a first penalty $Z_{ij}D_{ij}$ that penalizes a positive sample pair that is too far apart, and (2) a second penalty max(m−$D_{ij}$, 0) that penalizes a negative sample pair that is closer than the margin m. If a negative sample pair is already separated by the margin m, there is no penalty for the pair.

In one embodiment, each CNN 260A, 260B comprises a set of common intermediate layers 265 for learning mid-level features common to the set T. For example, in the training phase, each set of common intermediate layers 265 of each CNN 260A, 260B is trained to learn mid-level features relevant to both the primary task and the auxiliary task.

In one embodiment, each set of common intermediate layers 265 of each CNN 260A, 260B share network parameters (e.g., weight parameters for the first set of common intermediate layers 265 are identical to weight parameters for the second set of common intermediate layers 265).

In one embodiment, each CNN 260A, 260B further comprises a set of different independent layers 266. Each independent layer 266 corresponds to a task of the set T, and is trained to learn features relevant to the corresponding task. The different independent layers 266 are not shared between the different tasks of the set T. For example, in the training phase, one independent layer 266A of each CNN 260A, 260B is trained to learn features relevant to the primary task (e.g., face verification). Further, a different independent layer 266B of each CNN 260A, 260B is trained to learn features relevant to the auxiliary task (e.g., age estimation). As shown in FIG. 3, each set of common intermediate layers 265 of each CNN 260A, 260B is connected each independent layer 266 of the CNN 260A, 260B.

In the deployment phase, the different independent layers 266 of each CNN 260A, 260B provide different outputs. Specifically, each independent layer 266 of each CNN 260A, 260B provides an output relevant to a corresponding task. For example, each independent layer 266A of each CNN 260A, 260B provides an output 55 relevant to the primary task (e.g., face verification). Each independent layer 266B of each CNN 260A, 260B provides an output 55 relevant to the auxiliary task (e.g., age estimation).

In one embodiment, the independent layers 266A and 266B of each CNN 260A, 260B have different network parameters (e.g., weight parameters for an independent layer 266A is different from weight parameters for an independent layer 266B). In one embodiment, each independent layer 266A of each CNN 260A, 260B share network parameters (e.g., weight parameters for the independent layer 266A of the CNN 260A is identical to weight parameters for the independent layer 266A of the CNN 260B). In one embodiment, each independent layer 266B of each CNN 260A, 260B share network parameters (e.g., weight parameters for the independent layer 266B of the CNN 260A is identical to weight parameters for the independent layer 266B of the CNN 260B).

With the exception of the different independent layers 266, the first CNN 260A and the second CNN 260B have the same network architecture and share network parameters with each other to facilitate transfer of useful predictive knowledge between the tasks of the set T.

Figure 4:
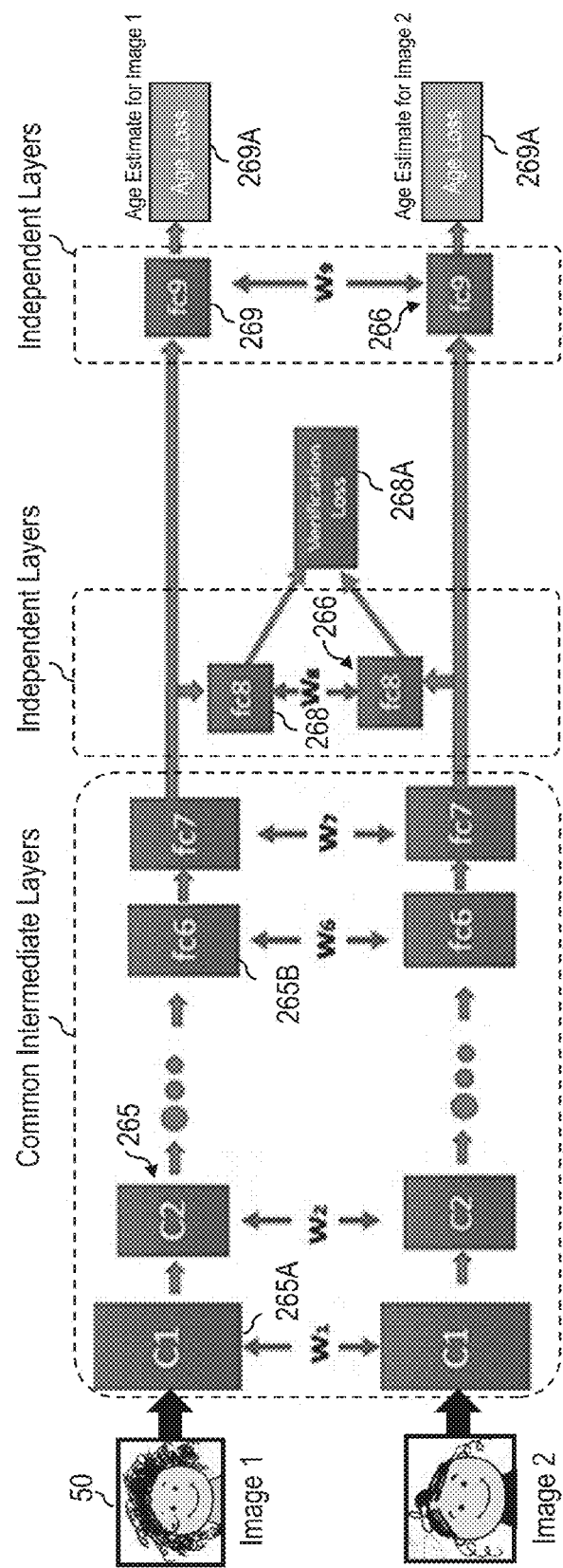
FIG. 4 illustrates an example configuration of the deep neural network, in one or more embodiments.

FIG. 4 illustrates an example configuration 270 of the deep neural network 250, in one or more embodiments. Assume the set T comprises face verification and age estimation. In the example configuration 270, face verification is designated as a primary task and age estimation is designated as an auxiliary task. In one embodiment, a multi-task learning objective for training the deep neural network 250 may be represented in accordance with equation (3) provided below:

$$\min_{\{\theta_F, \theta_A\}} L_F(\theta_F; X_F, y_F) + \alpha L_A(\theta_A; X_A, y_A) + \mathcal{R}(\{\theta_F, \theta_A\}), \quad (3)$$

wherein α denotes a tunable/configurable parameter indicative of importance of the auxiliary task, and α∈(0, 1).

Each set of common intermediate layers 265 of each CNN 260A, 260B includes one or more convolutional layers 265A (e.g., each convolutional layer C1, C2) and one or more fully-connected layers 265B (e.g., each fully-connected layer fc6, fc7). As shown in FIG. 4, each set of common intermediate layers 265 of each CNN 260A, 260B share network parameters (e.g., weight parameter $w_1$ for each convolutional layer C1, weight parameter $w_2$ for each convolutional layer C2, weight parameter $w_6$ for each fully-connected layer fc6, weight parameter $w_7$ for each fully-connected layer fc7, weight parameter $w_8$ for each fully-connected layer fc8, weight parameter $w_9$ for each fully-connected layer fc9, etc.).

In the training phase, each set of common intermediate layers 265 of each CNN 260A, 260B is trained to learn mid-level features common to the set of learning tasks. For example, in the training phase, each set of common intermediate layers 265 of each CNN 260A, 260B is trained to learn mid-level features relevant to both face verification and age estimation.

In the training phase, each independent layer 268 (e.g., each fully-connected layer fc8) of each CNN 260A, 260B is trained to learn features extracted from age-invariant facial regions (e.g., eyes, nose, mouth, etc.) relevant to face verification. Further, each independent layer 269 (e.g., each fully-connected layer fc9) of each CNN 260A, 260B is trained to learn features extracted from age-sensitive facial regions (e.g., forehead with wrinkles, etc.) relevant to age estimation.

For a particular age range (e.g., 20 to 29 years old), some facial regions may not change much (e.g., a forehead of an individual in this age range may not have wrinkles). In one embodiment, for this particular age range, the deep neural network 250 is trained to learn features extracted from these facial regions for face verification. For a different, older age range (e.g., 30 to 39 years old), however, these same facial regions may change a lot (e.g., a forehead of an individual in this different, older age range may have wrinkles). As such, for this different, older age range, the deep neural network 250 is not trained to learn features extracted from these same facial regions for face verification.

In one embodiment, the deep neural network 250 may leverage additional factors, such as race, sex, and environmental factors (e.g., lighting, etc.), to improve performance.

In one embodiment, the deep neural network 250 includes, for each task of the set T, a corresponding independent layer 266 for determining a loss related to the task. For example, as shown in FIG. 4, each independent layer 268 is utilized for determining loss related to face verification (e.g., contrastive loss), and each independent layer 269 is utilized for determining loss related to age estimation (e.g., softmax function).

The independent layers 268 and 269 of the deep neural network 250 provide different outputs. Specifically, each independent layer 268 provides an output 268A (Verification Loss) relevant to face verification. Each independent layer 269 provides an output 269A (Age Loss) relevant to age estimation. For example, in response to receiving a first input image 50 (Image 1) and a second input image 50 (Image 2) for processing in the deployment phase, the deep neural network 250 provides three different outputs—a first output 268A indicating whether the first and second input images 50 capture the same individual, a second output 269A comprising an estimated/predicted age information of the individual captured in the first input image 50 (Image 1), and a third output 269A comprising an estimated/predicted age information of the individual captured in the second input image 50 (Image 2).

In one embodiment, estimated/predicted age information provided by the deep neural network 250 may comprise, for at least one facial image processed by the deep neural network 250, a corresponding estimated/predicted age of the individual captured in the facial image. For example, the estimated/predicted age information may comprise at least one of a first estimated/predicted age of the individual captured in the first input image 50 (Image 1) and a second estimated/predicted age of the individual captured in the second input image 50 (Image 2).

In one embodiment, if ground truth information (i.e., an actual age label) for one input image 50 is provided/available to the deep neural network 250, estimated/predicted age information provided by the deep neural network 250 may comprise, for a different input image 50, a corresponding estimated/predicted age of the individual captured in the different input image 50. For example, if ground truth information (i.e., an actual age label) for the first input image 50 is provided/available to the deep neural network 250, the estimated/predicted age information may comprise, for the second input image 50, a corresponding estimated/predicted age of the individual captured in the second input image 50.

In one embodiment, age estimation is implemented as a classification problem. Specifically, an independent layer 269 is configured to: (1) encode each actual/known age label as a multi-dimensional vector (e.g., a 78-dimension vector) representing an exclusive indicator for age, (2) apply a sigmoid function to avoid occurrence of a gradient overflow problem, and (3) measure a difference between an estimated/predicted age label and ground truth information (i.e., an actual age label) using the loss related to age estimation (e.g., softmax loss).

In one embodiment, a cross-entropy function is applied to determine age loss for age classification. Let i denote a sample comprising a facial image of an individual, and let $y_i$ denote an actual age of the individual. In one embodiment, an independent layer 269 determines an estimated/predicted age label indicative of an estimated age of the individual in accordance with equation (4) provided below:

$$\tilde{y}_i(\theta_A) = \mathcal{P}_{\theta_A}(X_i) \quad (4).$$

An independent layer 269 determines the loss function $L_A$ for age estimation in accordance with equation (5) provided below:

$$L_A(\theta_A; X_A, y_A) = \quad (5)$$
$$-\sum_{ik} y_{ik} \log[\hat{X}_i(\theta_A)]_k - \sum_{ik} (1 - y_{ik}) \log(1 - [\tilde{X}_i(\theta_A)]_k),$$

For each age category of a plurality of age categories, an independent layer 269 applies a soft-max function to assign a probability to the age category. The independent layer 269 provides, as output, the estimated/predicted age label by selecting an age category that has the highest assigned probability across all the age categories.

With the exception of the independent layers 268 and 269, the first CNN 260A and the second CNN 260B have the same network architecture and share network parameters with each other to facilitate transfer of useful predictive knowledge between face verification and age estimation. Independent network parameters $\theta_F^I$ are applied to the independent layers 268. Independent network parameters $\theta_A^I$ are applied to the independent layers 269 of the CNN 260B. Coupling term $\mathcal{R}(\{\theta_F, \theta_V\})$ encourages similar values of corresponding network parameters. In one embodiment, coupling term $\mathcal{R}(\{\theta_F, \theta_V\})$ may be expressed in accordance with equation (6) provided below:

$$\mathcal{R}(\{\theta_F, \theta_V\}) = \beta \|\theta_F^S - \theta_A^S\|_F^2, \qquad (6)$$

wherein β denotes a configurable parameter indicative of an amount of useful predictive information to transfer from age estimation to face verification. The parameter β also provides effective regularization to prevent an overfitting problem resulting from reduction of degree of freedom between the CNN 260A and the CNN 260B.

Based on equations (3) and (6) provided above, the multi-task learning objective for the deep neural network 250 may be expressed as equation (7) provided below:

$$\min_{\theta_F = \{\theta_F^S, \theta_F^I\}, \theta_A = \{\theta_A^S, \theta_A^I\}} L_F(\theta_F; X_F, y_F) + \alpha L_A(\theta_A, X_A, y_A) + \beta \|\theta_F^S - \theta_A^S\|_F^2. \qquad (7)$$

If parameter β→∞, the first set of common intermediate layers 265 of the CNN 260A is identical to the second set of common intermediate layers 265 of the CNN 260B (i.e., the shared parts of CNNs 260A and 260B are identical). If parameter β→∞, equation (7) may be re-written as equation (8) provided below:

$$\min_{\theta^S, \theta_F^I, \theta_A^I} L_F(\{\theta^S, \theta_F^I\}; X_F, y_F) + \alpha L_A(\{\theta^S, \theta_A^I\}; X_A, y_A), \qquad (8)$$

wherein $\theta^S$ denotes shared network parameters for both age estimation and face verification (i.e., $\theta_F^S = \theta_A^S$).

One embodiment facilitates learning cross-age face verification by jointly learning cross-face age verification and age estimation. Jointly learning cross-face age verification and age estimation may effectively exclude learning of certain fine-grained features that may not be relevant. Furthermore, jointly learning cross-face age verification and age estimation places emphasis on using low-level features (e.g., general face features) to obtain feature information for each task at a higher level, thereby successfully preserving information for face verification while maintaining discriminative aging cues for age estimation.

The deep neural network 250 may be configured for different application uses. Some applications require a more robust face verification system, such as in law enforcement. For example, it may be necessary to track a criminal over a long period of time. As a result of aging, the facial appearance of the criminal may change a lot during this long period time. For this and other similar applications, the deep neural network 250 applies rigid face verification to identity age-invariant facial regions.

Some applications are more general applications in multimedia, such as face verification in phones. For example, as the lifetime of a particular phone is usually less than five years, facial appearances may not change a lot during the lifetime of the phone. For this and other similar applications, the deep neural network 250 applies relaxed face verification instead.

Figure 5:
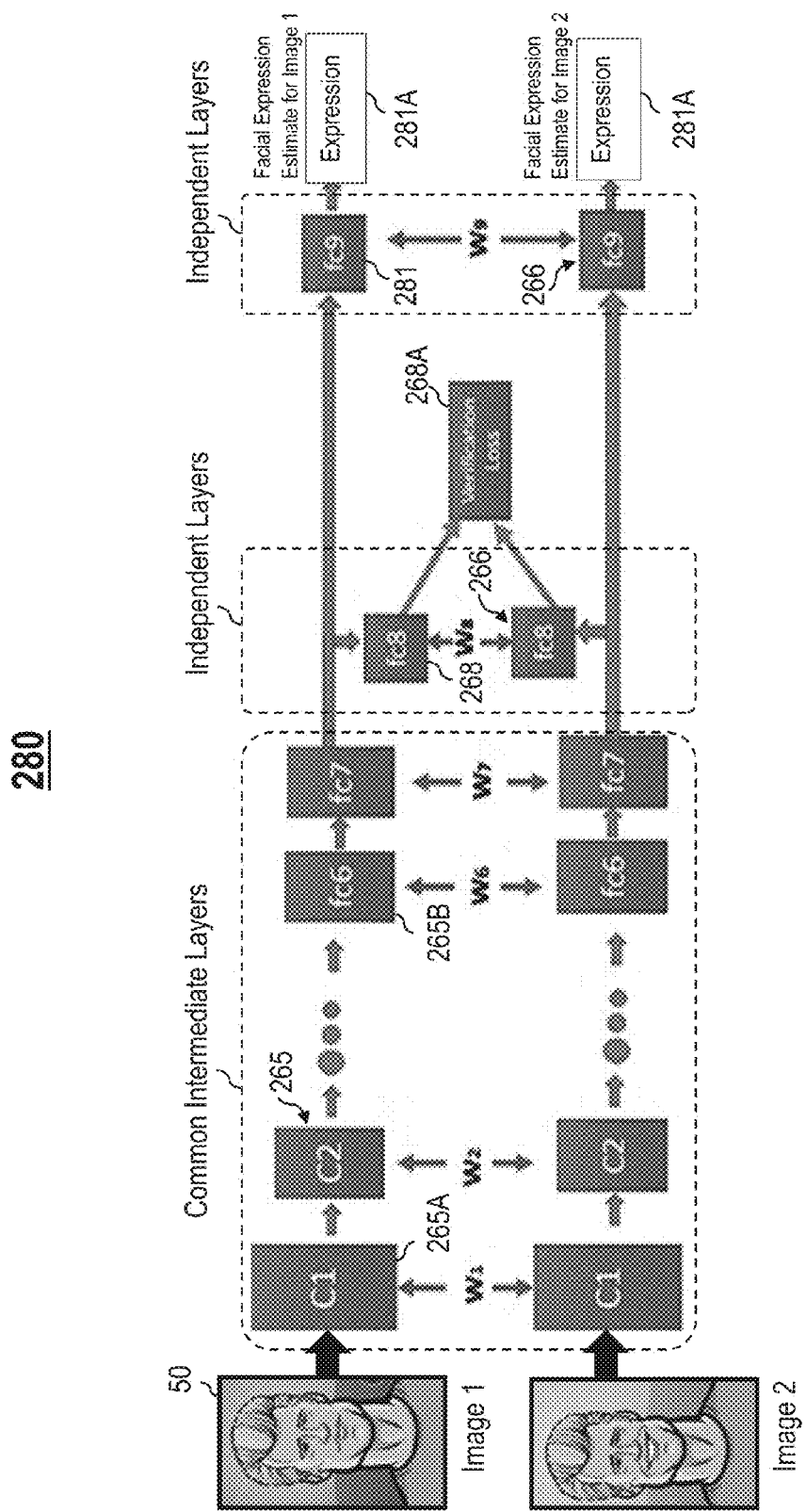
FIG. 5 illustrates another example configuration of the deep neural network, in one or more embodiments.

FIG. 5 illustrates another example configuration 280 of the deep neural network 250, in one or more embodiments. Assume the set T comprises face verification and expression recognition. In the example configuration 280, face verification is designated as a primary task and expression recognition is designated as an auxiliary task. As shown in FIG. 5, the different independent layers 266 of the deep neural network 250 include at least one independent layer 281 for classifying a facial expression captured in an input image 50. Each independent layer 281 provides an output 281A (Expression) relevant to expression recognition. For example, in response to receiving a first input image 50 (Image 1) and a second input image 50 (Image 2) for processing in the deployment phase, the deep neural network 250 provides three different outputs—a first output 268A indicating whether the first and second input images 50 capture the same individual, a second output 281A comprising an estimated/predicted facial expression classification of the individual captured in the first input image 50 (Image 1), and a third output 281A comprising an estimated/predicted facial expression classification of the individual captured in the second input image 50 (Image 2).

Figure 6:
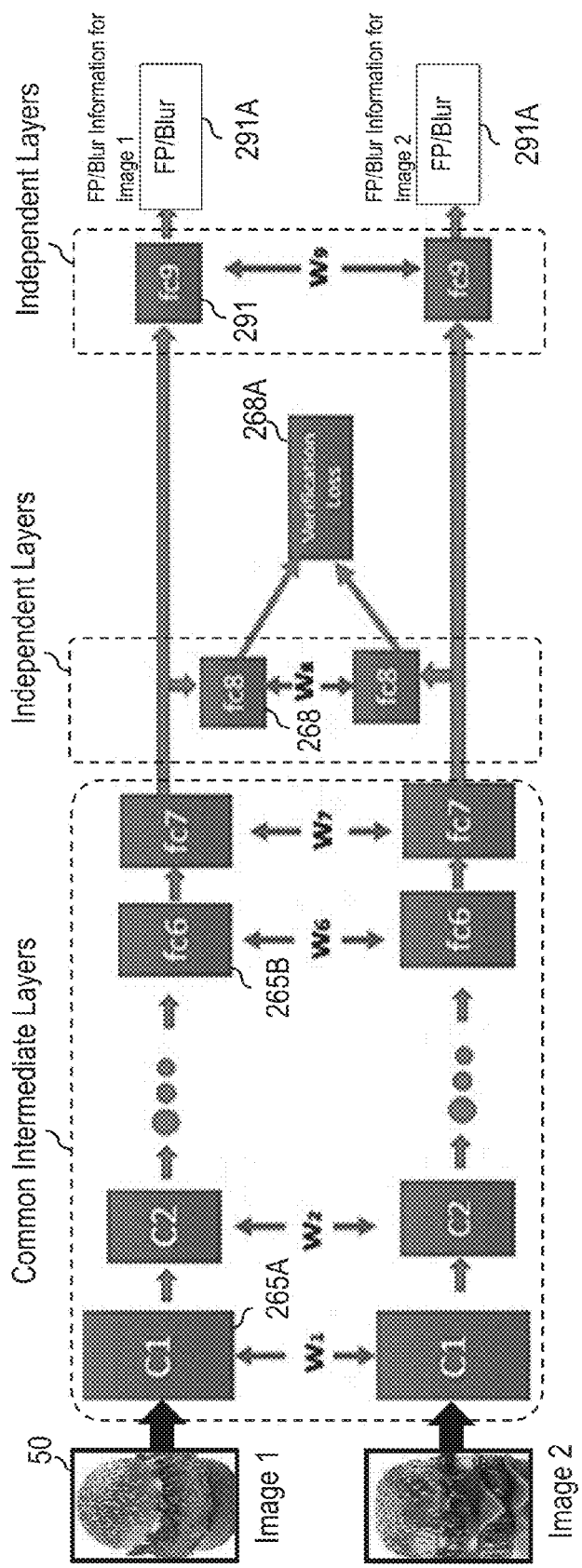
FIG. 6 illustrates another example configuration of the deep neural network, in one or more embodiments.

FIG. 6 illustrates another example configuration 290 of the deep neural network 250, in one or more embodiments. Assume the set T comprises object recognition and blur detection. In the example configuration 290, object recognition is designated as a primary task and blur detection is designated as an auxiliary task. As shown in FIG. 6, the different independent layers 266 of the deep neural network 250 include at least one independent layer 291 for determining whether an input image 50 is a false positive (FP) or blurred. Each independent layer 291 provides an output 291A (FP/Blur) relevant to blur detection. For example, in response to receiving a first input image 50 (Image 1) and a second input image 50 (Image 2) for processing in the deployment phase, the deep neural network 250 provides three different outputs—a first output 268A indicating whether the first and second input images 50 capture the same object, a second output 291A indicating whether the first input image 50 (Image 1) is a FP or blurred, and a third output 291A indicating whether the second input image 50 (Image 2) is a FP or blurred.

In another embodiment, instead of a deep neural network, the learning based model 130 (FIG. 2B) utilizes facial patch based classifiers for extracting salient facial regions. FIG. 7 illustrated another example framework 300 for the facial analysis system 100, in one or more embodiments. The learning based model 130 comprises one or more support vector machine (SVM) classifiers 310. In a training phase, the SVM classifiers 310 are trained to extract different facial patches from input images capturing a face. Different SVM classifiers 310 are trained for the different facial patches. Each facial patch has a corresponding SVM classifier 310 trained to learn the facial patch.

A determination unit 320 of the facial analysis system 100 is configured to apply, for each facial patch, cross-validation to evaluate recognition performance of a corresponding SVM classifier 310 for the facial patch. Based on output resulting from the SVM classifiers 310, a confidence measurement unit 330 of the facial analysis system 100 is configured to evaluate significance of the different facial patches. For example, specific facial regions may be relevant to a specific task, and these facial regions are ranked based on recognition performance for the specific task. An output unit 340 of the facial analysis system 100 is configured to provide a final output including information relevant to the specific task (e.g., identity, gender, race, ethnicity, etc.) based on a combination of the top-ranked facial regions determined to be relevant to the specific task.

Figure 8:
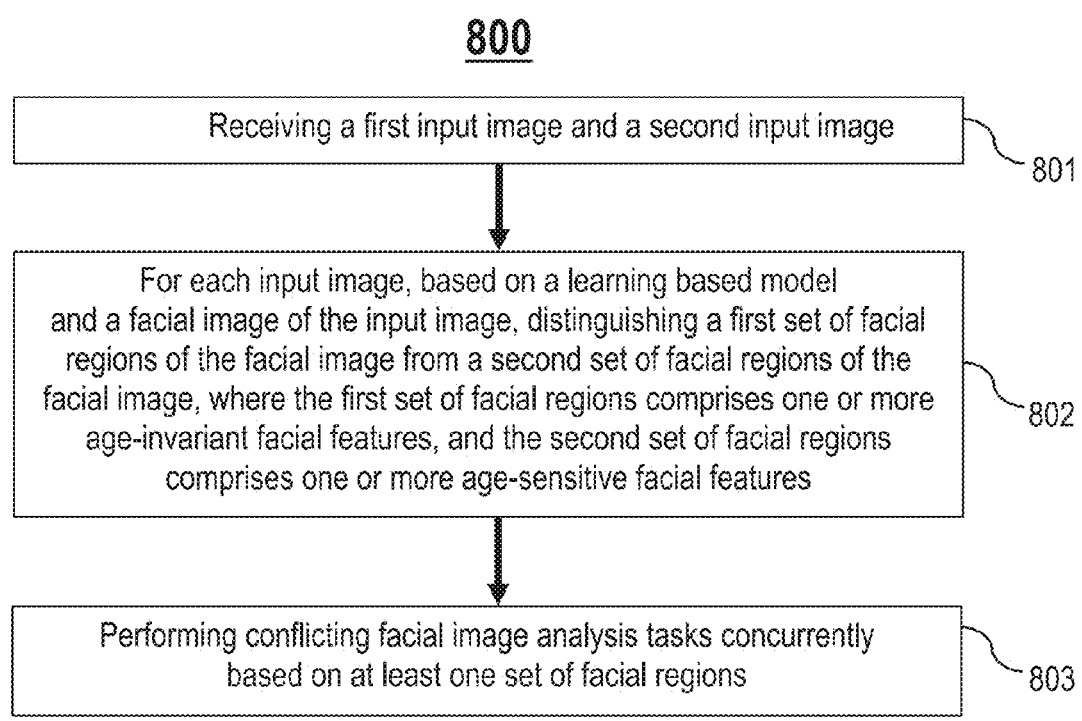
FIG. 8 is a flowchart of an example process for performing conflicting facial image analysis tasks, in one or more embodiments.

FIG. 8 is a flowchart of an example process 800 for performing conflicting facial image analysis tasks, in one or more embodiments. In process block 801, receive a first input image and a second input image. In process block 802, for each input image, based on a learning based model and a facial image of the input image, distinguishing a first set of facial regions of the facial image from a second set of facial regions of the facial image, where the first set of facial regions comprises one or more age-invariant facial features, and the second set of facial regions comprises one or more age-sensitive facial features. In process block 803, perform conflicting facial image analysis tasks concurrently based on at least one set of facial regions. For example, face verification and age estimation may be performed concurrently based on each set of facial regions comprising one or more age-invariant facial features and each set of facial regions comprising one or more age-sensitive facial features, respectively.

In one embodiment, process blocks 801-803 may be performed by the facial analysis system 100.

Figure 9:
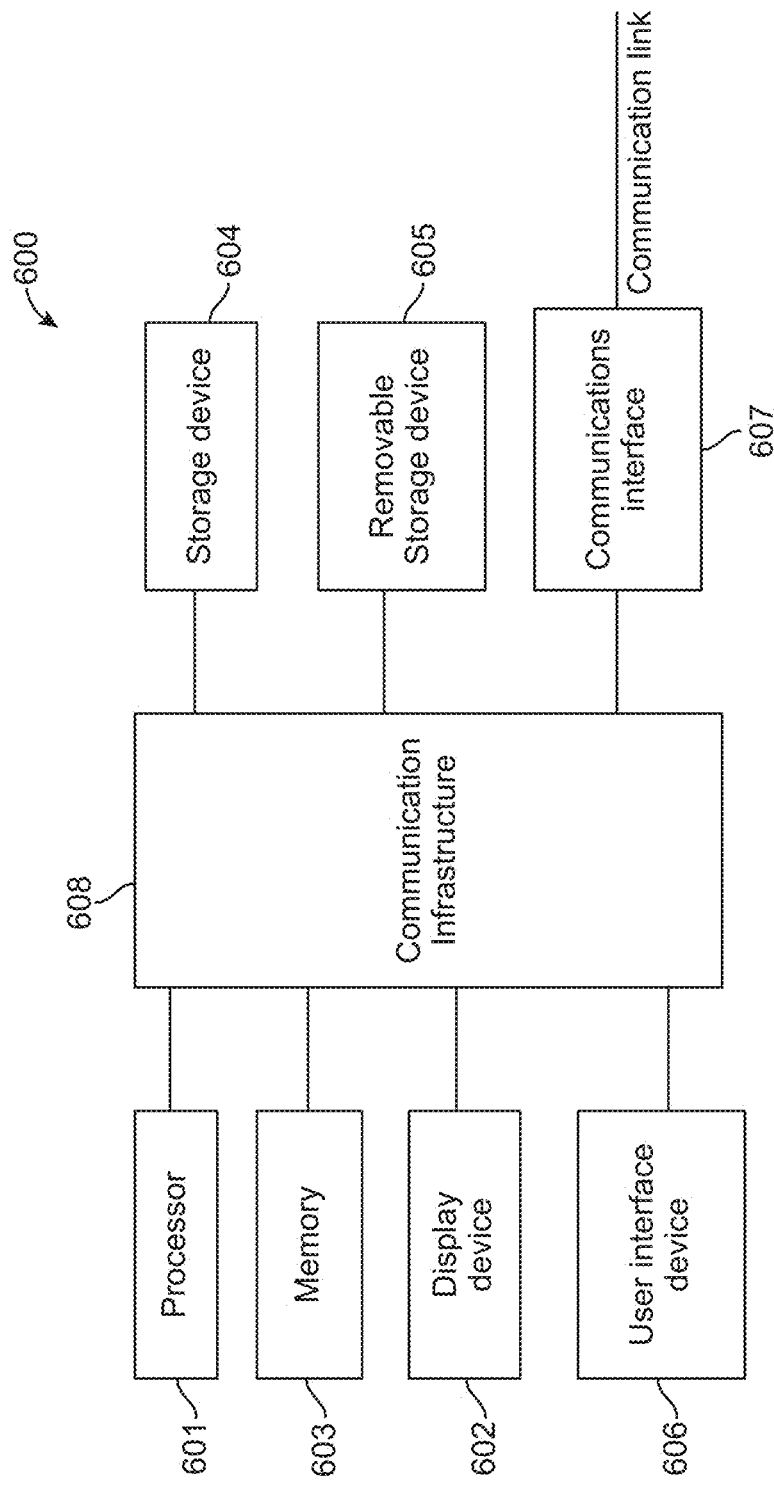
FIG. 9 is a high-level block diagram showing an information processing system comprising a computer system useful for implementing the disclosed embodiments.

FIG. 9 is a high-level block diagram showing an information processing system comprising a computer system 600 useful for implementing the disclosed embodiments. Each system 40, 100 may be incorporated in a display device 300 or a server device 210. The computer system 600 includes one or more processors 601, and can further include an electronic display device 602 (for displaying video, graphics, text, and other data), a main memory 603 (e.g., random access memory (RAM)), storage device 604 (e.g., hard disk drive), removable storage device 605 (e.g., removable storage drive, removable memory module, a magnetic tape drive, optical disk drive, computer readable medium having stored therein computer software and/or data), viewer interface device 606 (e.g., keyboard, touch screen, keypad, pointing device), and a communication interface 607 (e.g., modem, a network interface (such as an Ethernet card), a communications port, or a PCMCIA slot and card). The communication interface 607 allows software and data to be transferred between the computer system and external devices. The system 600 further includes a communications infrastructure 608 (e.g., a communications bus, cross-over bar, or network) to which the aforementioned devices/modules 601 through 607 are connected.

Information transferred via communications interface 607 may be in the form of signals such as electronic, electromagnetic, optical, or other signals capable of being received by communications interface 607, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to generate a computer implemented process.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A method comprising:
receiving, via a processor, a first input image and a second input image, wherein each input image comprises a facial image of an individual;
for each input image:
based on a learning based model trained to learn different facial features relevant to different facial image analysis tasks and further trained to distinguish different facial regions that include the different facial features, determining, via the processor, a corresponding first set of facial regions of the facial image and a corresponding second set of facial regions of the facial image, wherein the corresponding first set of facial regions comprises at least one facial region including one or more age-invariant facial features, and the corresponding second set of facial regions comprises at least one other facial region including one or more age-sensitive facial features; and
performing, via the processor, at least one of the different facial image analysis tasks based on at least one facial feature extracted from at least one set of facial regions.

2. The method of claim 1, wherein performing, via the processor, at least one of the different facial image analysis tasks based on at least one facial feature extracted from at least one set of facial regions comprises:

determining whether the first input image and the second input image comprise facial images of a same individual by performing face verification based on at least one age-invariant facial feature extracted from each first set of facial regions corresponding to each input image; and for each input image, estimating an age of the individual captured in the input image by performing age estimation based on at least one age-sensitive facial feature extracted from the second set of facial regions corresponding to the input image.

3. The method of claim 2, wherein the age estimation and the face verification are performed concurrently.

4. The method of claim 1, wherein the learning based model is simultaneously trained to distinguish one or more facial regions comprising one or more age-sensitive facial features from one or more other facial regions comprising one or more age-invariant facial features based on a pair of training images comprising facial images of a same individual at different ages.

5. The method of claim 1, wherein a facial region comprising one or more age-invariant facial features comprises a region of a face that includes one of eyes, nose, or mouth.

6. The method of claim 1, wherein a facial region comprising one or more age-sensitive facial features comprises a region of a face that includes a forehead.

7. The method of claim 1, wherein the learning based model is configured to apply different degrees of face verification including a first degree of face verification and a second degree of face verification, and the first degree of face verification is based more on facial regions comprising age-invariant facial features than the second degree of face verification.

8. The method of claim 1, wherein the learning based model comprises one of: a deep neural network, or one or more support vector machines.

9. A system, comprising:
at least one processor; and
a non-transitory processor-readable memory device storing instructions that when executed by the at least one processor causes the at least one processor to perform operations including:
  receiving a first input image and a second input image, wherein each input image comprises a facial image of an individual;
  for each input image:
    based on a learning based model trained to learn different facial features relevant to different facial image analysis tasks and further trained to distinguish different facial regions that include the different facial features, determining a corresponding first set of facial regions of the facial image and a corresponding second set of facial regions of the facial image, wherein the corresponding first set of facial regions comprises at least one facial region including one or more age-invariant facial features, and the corresponding second set of facial regions comprises at least one other facial region including one or more age-sensitive facial features; and
    performing at least one of the different facial image analysis tasks based on at least one facial feature extracted from at least one set of facial regions.

10. The system of claim 9, wherein performing at least one of the different facial image analysis tasks based on at least one facial feature extracted from at least one set of facial regions comprises:

determining whether the first input image and the second input image comprise facial images of a same individual by performing face verification based on at least one age-invariant facial feature extracted from each first set of facial regions corresponding to each input image; and for each input image, estimating an age of the individual captured in the input image by performing age estimation based on at least one age-sensitive facial feature extracted from the second set of facial regions corresponding to the input image.

11. The system of claim 10, wherein the age estimation and the face verification are performed concurrently.

12. The system of claim 9, wherein the learning based model is simultaneously trained to distinguish one or more facial regions comprising one or more age-sensitive facial features from one or more other facial regions comprising one or more age-invariant facial features based on a pair of training images comprising facial images of a same individual at different ages.

13. The system of claim 9, wherein the learning based model is configured to apply different degrees of face verification including a first degree of face verification and a second degree of face verification, and the first degree of face verification is based more on facial regions comprising age-invariant facial features than the second degree of face verification.

14. The system of claim 9, wherein the learning based model comprises one of: a deep neural network, or one or more support vector machines.

15. A non-transitory computer readable storage medium including instructions to perform a method comprising:
  receiving a first input image and a second input image, wherein each input image comprises a facial image of an individual;
  for each input image:
    based on a learning based model trained to learn different facial features relevant to different facial image analysis tasks and further trained to distinguish different facial regions that include the different facial features, determining a corresponding first set of facial regions of the facial image and a corresponding second set of facial regions of the facial image, wherein the corresponding first set of facial regions comprises at least one facial region including one or more age-invariant facial features, and the corresponding second set of facial regions comprises at least one other facial region including one or more age-sensitive facial features; and
    performing at least one of the different facial image analysis tasks based on at least one facial feature extracted from at least one set of facial regions.

16. The computer readable storage medium of claim 15, wherein performing at least one of the different facial image analysis tasks based on at least one facial feature extracted from at least one set of facial regions comprises:

determining whether the first input image and the second input image comprise facial images of a same individual by performing face verification based on at least one age-invariant facial feature extracted from each first set of facial regions corresponding to each input image; and for each input image, estimating an age of the individual captured in the input image by performing age estimation based on at least one age-sensitive facial feature extracted from the second set of facial regions corresponding to the input image.

17. The computer readable storage medium of claim 16, wherein the age estimation and the face verification are performed concurrently.

18. The computer readable storage medium of claim 15, wherein the learning based model is simultaneously trained to distinguish one or more facial regions comprising one or more age-sensitive facial features from one or more other facial regions comprising one or more age-invariant facial features based on a pair of training images comprising facial images of a same individual at different ages.

19. The computer readable storage medium of claim 15, wherein the learning based model is configured to apply different degrees of face verification including a first degree of face verification and a second degree of face verification, and the first degree of face verification is based more on facial regions comprising age-invariant facial features than the second degree of face verification.

20. The computer readable storage medium of claim 15, wherein the learning based model comprises one of: a deep neural network, or one or more support vector machines.

* * * * *